United States Patent [19]
Lenzke

[11] Patent Number: 5,247,850
[45] Date of Patent: Sep. 28, 1993

[54] ACTUATING DEVICE FOR A HAND BRAKE OF A MOTOR VEHICLE

[75] Inventor: Andreas Lenzke, Sprockhövel, Fed. Rep. of Germany

[73] Assignee: ED. Scharwachter GmbH & Co. KG, Remscheid, Fed. Rep. of Germany

[21] Appl. No.: 959,836

[22] Filed: Oct. 13, 1992

[30] Foreign Application Priority Data

Oct. 15, 1991 [DE] Fed. Rep. of Germany ....... 4134052

[51] Int. Cl.⁵ .......................... G05G 1/04; G05G 5/06
[52] U.S. Cl. ........................................ 74/523; 74/575;
74/535; 74/537; 74/538; 74/528
[58] Field of Search ................... 74/535-538,
74/575-578, 523-526, 557, 501.5 R, 502

[56] References Cited

U.S. PATENT DOCUMENTS

| | | | |
|---|---|---|---|
| 4,512,210 | 4/1985 | Gurney | 74/538 X |
| 4,770,057 | 9/1988 | Foggini | 74/523 |
| 4,819,501 | 4/1989 | Kraus et al. | 74/538 |
| 5,001,942 | 3/1991 | Boyer | 74/501.5 R |
| 5,067,366 | 11/1991 | Gandiglio | 74/535 |
| 5,159,850 | 11/1992 | Nadi et al. | 74/523 |

FOREIGN PATENT DOCUMENTS

| | | | |
|---|---|---|---|
| 2645982 | 4/1978 | Fed. Rep. of Germany | 74/523 |
| 3900174 | 7/1990 | Fed. Rep. of Germany | 74/523 |
| 3900661 | 7/1990 | Fed. Rep. of Germany | 74/523 |
| 0053657 | 2/1990 | Japan | 74/523 |
| 2196416 | 4/1988 | United Kingdom | 74/523 |
| 2244117 | 11/1991 | United Kingdom | 74/535 |

*Primary Examiner*—Vinh T. Luong
*Attorney, Agent, or Firm*—Anderson Kill Olick & Oshinsky

[57] ABSTRACT

The actuating device for a hand brake of a motor vehicle includes a hand lever pivotably supported on a support bracket fixedly secured to the vehicle body and displaceable against a bias of a return spring, and a traction lever that connects the hand lever with the drive element for actuating means of at least one wheel brake assembly of the motor vehicle. The actuating device further includes an automatically locking latching mechanism which is associated with the traction lever and is not connected with the hand lever. The latching mechanism provides for predetermined positioning of the drive element necessary for application of the brake. The latching mechanism is released with an auxiliary rod displaceable within the hand lever against a spring bias.

11 Claims, 3 Drawing Sheets

ACTUATING DEVICE FOR A HAND BRAKE OF A MOTOR VEHICLE

BACKGROUND OF THE INVENTION

The invention relates to an actuating device for a hand brake of a motor vehicle comprising a hand lever pivotably secured to a support bracket fixedly attached to the vehicle body, and movable against a bias of return spring, a drive element for an actuating mechanism of at least one wheel brake assembly and connected with the hand lever, and an automatically locking retaining mechanism for predetermined positioning of the actuating mechanism of the wheel brake assembly. The retaining mechanism is released with an auxiliary rod longitudinally displaceable in the hand lever against a bias of another return spring.

Usually a hand lever of an actuating device for a hand brake of a motor vehicle is formed as a two-arm lever pivotably mounted about a stationary axle secured on the support bracket which is fixedly attached to the vehicle body. The hand lever is connected with the drive element in the form of a pull rod or a Bowden cable which acts on the at least one wheel brake assembly. The two-arm lever is connected with the drive element by a lever crank arranged opposite a lever crank secured to the handle. Locking of the hand lever in its position corresponding to application of the brake is effected with a detent pawl which cooperates with a toothed segment secured to the vehicle body, is spring-biased in the latching direction, and is releasable with a spring-biased auxiliary rod longitudinally displaceable within the hand lever.

With such a construction of the actuating device for a hand brake, the hand lever, in an applied position of the brake assembly, remains in a more or less upright position and returns to its normal initial position when the hand brake is released. In many cases, the hand lever, especially when it is not in a fully upright positions, obstructs operation of a vehicle, which, e.g., is the case when the vehicle has a central gangway between the two front seats, or when there are three front seats which is, in particular the case in modern large limousines, or, finally, when in a sport vehicle the hand lever is located between a seat and a vehicle door. In order to eliminate, under certain circumstances, the hand lever which, when in a raised position, obstructs operation of the vehicle, hand brakes are used which permit placing the actuating device for the brake in a position where the hand lever does not obstruct vehicle operation. However, this type of brakes have a number of drawbacks which, primarily consist in that, as a rule, their manufacturing and mounting costs significantly exceed those of conventional hand lever-operated hand brakes.

Accordingly, an object of the invention is an actuating device for a hand brake of a motor vehicle in which the hand lever can be put in a tilted position, which is characterized by low manufacturing and mounting costs, and which insures a reliable operation of the brake in its applied position.

SUMMARY OF THE INVENTION

According to the invention, there is provided an actuating device for a hand brake of a motor vehicle in which a traction lever connects the hand lever with the drive element for the wheel brake assembly, and the traction lever is associated with an automatically locking latching mechanism not connected with the hand lever. This insures that as soon as the brake assembly is brought with the hand lever into its applied position, the brake assembly is held in this position with the latching mechanism for the traction lever while the hand lever, upon application of the brake, can be moved to a tilted non-obstructive position, without the hand brake being released. At that, addition of the traction lever does not lead to an increase of manufacturing costs and, because of a compact construction of the actuating device, there is no need in additional space for its mounting.

In a preferred embodiment of the invention, it is further contemplated that the hand lever and the traction lever are both mounted for pivotal movement about a common axle located on a support bracket that is fixedly secured to the vehicle body. A return spring supported on the support bracket acts on the hand lever to automatically move the hand lever to its non-obstructive position.

In an especially simple and, therefore, even more preferred embodiment of the invention, it is further contemplated that the traction lever, when moving in a direction corresponding to application of the hand brake, is connected with the hand lever by a dog member that cooperates, during movement of the hand lever in a direction opposite to the direction hand lever moves upon application of the hand brake, with a longitudinal curved groove provided in the traction lever concentric with the common axle of the traction and hand levers, to enable free movement of the hand lever in this opposite direction. The traction lever is associated with a latching device formed as a rocker-shaped detent pawl that is mounted on the traction lever and pivots against a bias of a return spring. The detent pawl cooperates with a toothed segment fixedly secured to an extension of the support bracket and is concentric with the common axle of the hand and traction levers. The latching device, the detent pawl is released with an auxiliary rod longitudinally displaceable within the hand lever.

In an even more preferred embodiment of the invention, it is further contemplated that the side surface of the traction lever adjacent to the hand lever, has a profiled cavity concentric with the common axle of the hand and traction levers for receiving the detent pawl therein. The profiled cavity has a radial recess for receiving a lever crank of the detent pawl forming rocker in such a manner that the auxiliary rod can cooperate with the lever crank only in the region of this recess. The radial recess is advantageously provided in the upper end of the profiled cavity of the traction lever. The hand brake is released with the hand lever upon forcelocking engagement of the auxiliary rod with the bottom edge of the recess.

In order to obtain a construction of an actuating device which can be manufactured with minimal costs and will require a minimal mounting space in a vehicle, it is contemplated, according to the invention, that the hand lever and the traction lever have essentially U-shaped profiles and overlap each other, and the traction lever encompasses the support bracket which is formed as a flat workpiece. The detent pawl cooperates with a return spring that is formed as a leg spring and is arranged inside the profiled cavity of the traction lever. The leg spring is attached to a bolt extending in the traction lever.

In yet another embodiment of the invention, it is contemplated that on the base portion of the of the hand lever there is provided a curved channel-shaped side bulge associated with the head of a bearing bolt of the detent pawl. The auxiliary rod, which is displaceable in the hand lever against a spring bias is, in a known manner, actuated with an actuation knob and is brought into engagement with the profiled cavity of the traction lever so that a formlocking connection of the hand lever with the traction lever is established, whereby the traction lever can be returned to its non-operational initial position by the hand lever. This movement of the traction lever releases the brake.

BRIEF DESCRIPTION OF THE DRAWINGS

The present invention both as to its construction so to its mode of operation will be best understood from the following detailed description of the preferred embodiment when read with reference to the accompanying drawings, wherein.

DETAILED DESCRIPTION OF THE PREFERRED EMBODIMENT

Figure 1:
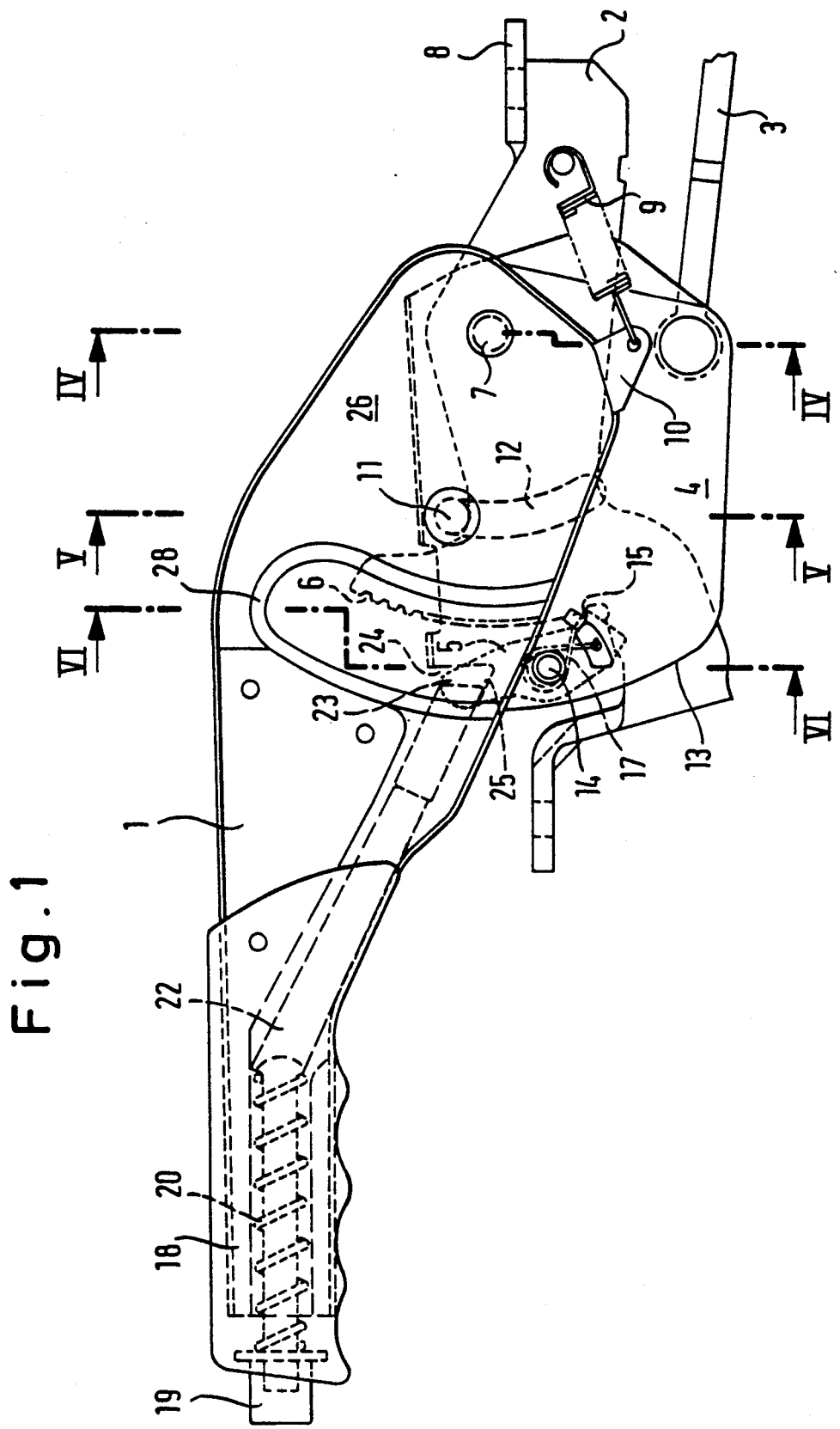
FIG. 1 shows a side view of an actuating device for a hand brake of a motor vehicle according to the present invention in an initial position.
Figure 2:
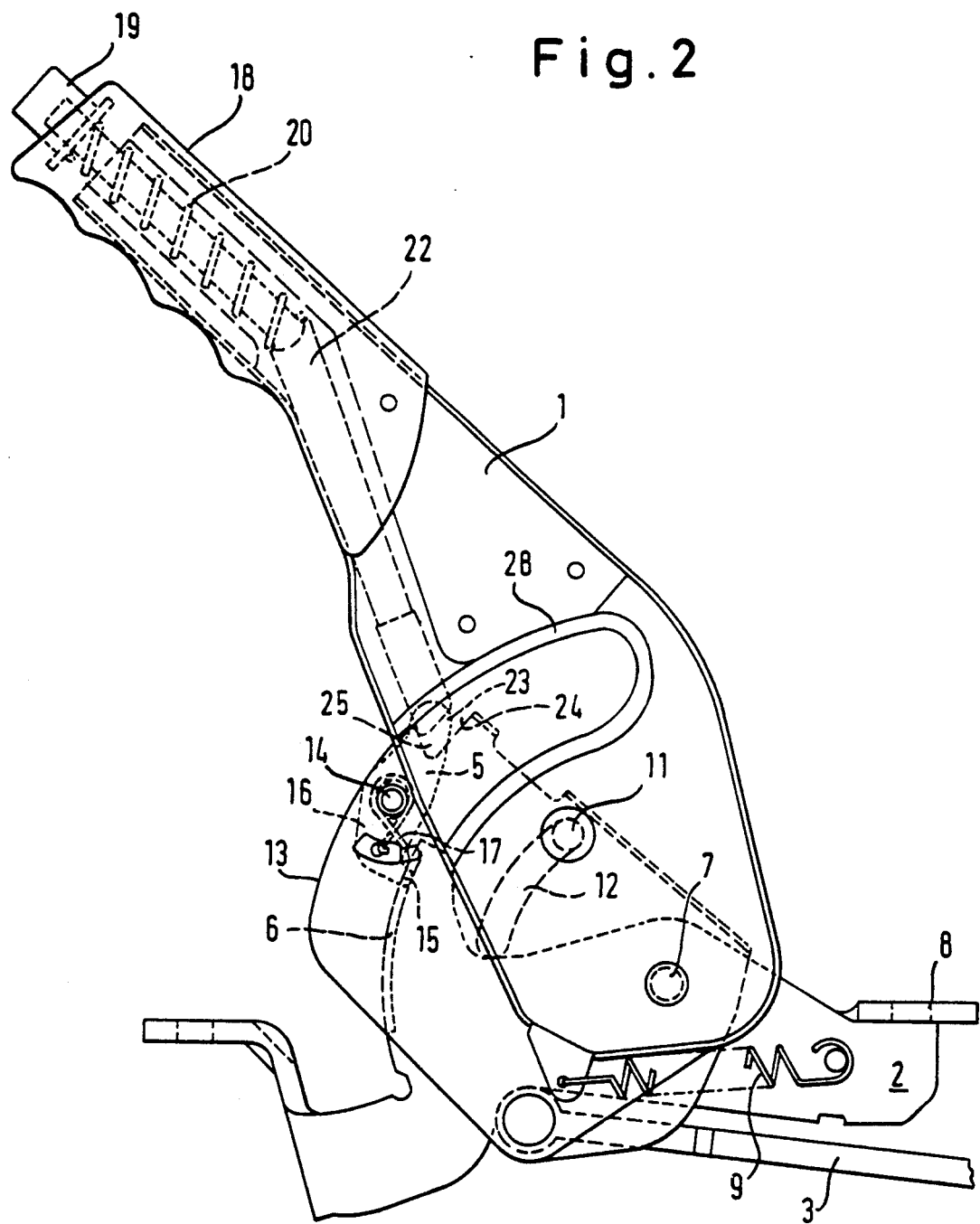
FIG. 2 shows a side view of the actuating device in a position corresponding to application of the brake.
Figure 3:
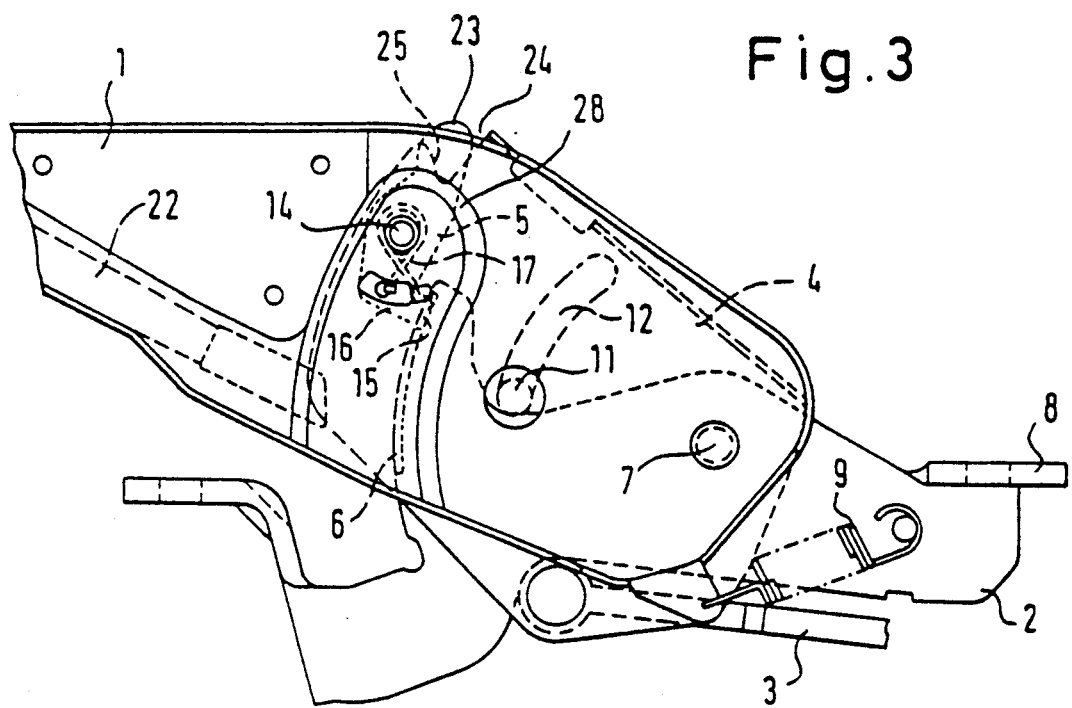
FIG. 3 shows a side view of the actuating device in a position corresponding to full application of the brake.

The drawings show an actuating device for a hand or parking brake for a motor vehicle, including primarily a hand lever 1 pivotably mounted on a support bracket 2 fixedly secured with a bolt (not shown) to the vehicle body, and a traction lever 4 that connects the hand lever to the pull rod 3 which serves as a drive element for actuating a motor vehicle brake assembly. A detent pawl 5 formed as a rocker serves for fixing the traction lever 4 to a toothed segment 6 formed integrally with the support bracket 2, in an operating position of the traction lever 4. The hand lever 1 and the traction lever 4 both pivot about a common axle 7 on which the support bracket 2 is mounted. The support bracket 2, in the described embodiment, is formed as a flat workpiece with side attachment flanges 8. A first return, helical, spring 9 supported on the support bracket 2 is associated with the hand lever. The return spring 9 is attached to a bracket 10 of the hand lever 1. The hand lever 1, when moving in a direction corresponding to hand brake application, is coupled to the traction lever 4 by a dog member 11. The dog member 11 is engaged in a curved groove 12 provided in the traction lever 4 concentric with the axle 7 for enabling hand lever movement in an opposite direction. The traction lever 4, on its side surface 13 adjacent to the hand lever 1, has a profiled cavity 13a in which the detent pawl 5 is mounted. The detent pawl 5 pivots about a bolt-shaped pin 14. The traction lever 4 is retained, in its position corresponding to hand brake application, by interlocking of the indexing tooth 15 of the crank 16 of the detent pawl 5 with the toothed segment 6. The indexing tooth 15 is held in a secure engagement with the toothed segment 6 by a return leg spring 17 supported on the pin 14. An auxiliary rod 22 longitudinally displaceable in the hand lever 1 against a bias of second return spring 20 provides for release of the hand brake. The auxiliary rod 22 is actuated with an actuation knob 19 extending through the handle 18 of the hand lever 1. The auxiliary rod 22 cooperates with a second crank 23 of the detent pawl 5. The traction lever 4 is provided on its side surface 13 in the region of its upper end with a groove 24 extending radially to the axle 7, and the crank 23 of the detent pawl 5 engages the groove 24 in such a manner that the detent pawl is released by the auxiliary rod 22 only when the hand lever 1 is upright in its position corresponding to full application of the brake. For releasing the detent pawl and, thus, the hand brake, the auxiliary rod 22 engages a lower edge 25 of the groove 24 so that the traction lever 4 is connected with the hand lever 1 when the latter moves in a direction corresponding to release of the brake, as long as the auxiliary rod 22 is held in its displaced position.

Figure 4:
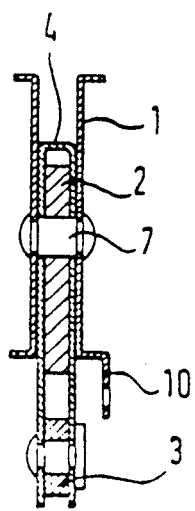
FIG. 4 shows a cross-sectional view along line IV—IV in FIG. 1.
Figure 5:
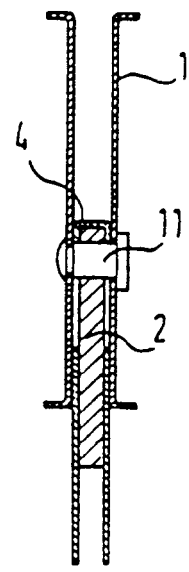
FIG. 5 shows a cross-sectional view along line V—V in FIG. 1.
Figure 6:
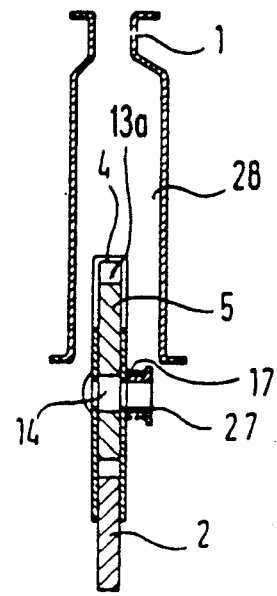
FIG. 6 shows a cross-sectional view along line VI—VI in FIG. 1.

As specifically shown in FIGS. 4–6, the base portions of the hand and traction levers are made of a U-shaped sheet material and overlap each other. The traction lever 4 further encompasses the middle portion of the support bracket 2 which is formed of a flat material. Thus, due to interoverlapping arrangement of separate workpieces, there is provided a space saving configuration or form of a hand or parking brake. Associated with this interoverlapping arrangement is a curved channel-shaped bulge 28 in the base portion of the hand lever 1 which is concentric to the axle 7 and is associated with the head of the bolt-shaped pin 14 which head serves as an abutment for the detent pawl biasing spring 17.

While a particular embodiment of the invention has been shown and described, various modifications thereof will be apparent to those skilled in the art and, therefore, it is not intended that the invention be limited to the disclosed embodiment or to the details thereof, and the departure may be made therefrom within the spirit and scope of the invention as defined in the appended claims.

What is claimed is:

1. A device for actuating a hand brake of a motor vehicle having a body and at least one wheel brake assembly, said actuating device comprising:
   a support bracket fixedly securable to the vehicle body;
   a hand lever pivotally supported on said support bracket and displaceable against a bias of a first return spring;
   a drive element for actuating at least one wheel brake assembly;
   a traction lever for connecting said hand lever with said drive element;
   automatically locking latching means associated with said traction lever and unconnected with said hand lever for predetermining positioning of said drive element;
   an auxiliary rod longitudinally displaceable inside said hand lever against a bias of a second return spring for releasing said latching means;
   a common axle mounted on said support bracket for pivotally supporting said hand lever and said traction lever; and
   a dog member for connecting said hand lever and said traction lever for joint movement in one direction, said traction lever having a curved longitudinal groove concentric to the common axle for receiving said dog member, said dog member being displaceable in said longitudinal groove to enable movement of said hand lever relative to said traction lever in a direction opposite to said one direction.

2. A device for actuating a hand brake of a motor vehicle having a body and at least one wheel brake assembly, said actuating device comprising:
   a support bracket fixedly securable to the vehicle body;
   a hand lever pivotally supported on said support bracket and displaceable against a bias of a first return spring;
   a drive element for actuating at least one wheel brake assembly;
   a traction lever for connecting said hand lever with said drive element;
   automatically locking latching means associated with said traction lever and unconnected with said hand lever for predetermining positioning of said drive element;
   an auxiliary rod longitudinally displaceable inside said hand lever against a bias of a second return spring for releasing said latching means;
   a common axle mounted on said support bracket for pivotally supporting said hand lever and said traction lever; and
   wherein said latching means comprises a spring-biased rocker-shaped detent pawl pivotally supported on said traction lever, said actuating device further comprising a toothed segment secured on an extension of said support bracket, arranged concentric to said common axle, and cooperating with said detent pawl for predetermined positioning of said traction lever.

3. An actuating device as set forth in claim 2, wherein said traction lever has a side surface located adjacent to said hand lever and having a profiled cavity, said detent pawl being located in said profiled cavity.

4. An actuating device as set forth in claim 3, wherein said detent pawl has a crank at a free end thereof, said profiled cavity of said adjacent side surface of said traction lever including a radially extending groove for receiving said crank, said auxiliary rod cooperating with said crank only in a region of said radially extending groove and cooperating with a bottom edge of said radially extending groove to connect said traction lever with said hand lever for joint movement in a direction corresponding to release of the brake.

5. An actuating device as set forth in claim 4, wherein said radially extending groove is formed at an upper end of said profiled cavity.

6. An actuating device as set forth in claim 3, wherein said latching means includes a return leg spring for biasing said detent pawl, said return leg spring being located in said profiled cavity and supported on a pin extending in said profiled cavity for supporting said detent pawl.

7. An actuating device as set forth in claim 6, wherein said pin has a head, said hand lever having a base portion and a curved channel-shaped side bulge formed on said base portion and associated with said head.

8. An actuating device as set forth in claim 4, further comprising an actuation knob for displacing said auxiliary rod into engagement with said bottom edge of said radially extending groove.

9. A device for actuating a hand brake of a motor vehicle having a body and at least one wheel brake assembly, said actuating device comprising,
   a support bracket fixedly securable to the vehicle body;
   a hand lever pivotally supported on said support bracket and displaceable against a bias of a first return spring;
   a drive element for actuating at least one wheel brake assembly;
   a traction lever for connecting said hand lever with said drive element;
   automatically locking latching means associated with said traction lever and unconnected with said hand lever for predetermining positioning of said drive element;
   an auxiliary rod longitudinally displaceable inside said hand lever against a bias of a second return spring for releasing said latching means;
   a common axle mounted on said support bracket for pivotally supporting said hand lever and said traction lever; and
   wherein said hand lever and said traction lever have a substantially U-shaped cross-section and overlap each other, said traction lever encompassing said support bracket formed of a flat sheet material.

10. An actuating device as set forth in claim 9, further comprising a common axle mounted on said support bracket for pivotably supporting said hand lever and said traction lever.

11. An actuating device as set forth in claim 9, wherein said first return spring is supported on said support bracket.

* * * * *